US 7,903,002 B2

(12) United States Patent
Olsson et al.

(10) Patent No.: US 7,903,002 B2
(45) Date of Patent: Mar. 8, 2011

(54) ELECTRONIC DEVICE HAVING VIBRATION INPUT RECOGNITION AND METHOD

(75) Inventors: Stefan Olsson, Lund (SE); Anders Wihlborg, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 964 days.

(21) Appl. No.: 11/749,784

(22) Filed: May 17, 2007

(65) Prior Publication Data

US 2008/0284620 A1 Nov. 20, 2008

(51) Int. Cl.
*H03K 19/00* (2006.01)
(52) U.S. Cl. .............................. 341/22; 345/168; 345/169
(58) Field of Classification Search .................. None
See application file for complete search history.

(56) References Cited

U.S. PATENT DOCUMENTS

| | | | |
|---|---|---|---|
| 6,839,464 B2 * | 1/2005 | Hawkins et al. .............. | 382/187 |
| 2002/0135570 A1 | 9/2002 | Iisaka et al. | |
| 2005/0105799 A1 * | 5/2005 | Strohecker et al. ........... | 382/186 |
| 2006/0071912 A1 | 4/2006 | Hill et al. | |

FOREIGN PATENT DOCUMENTS

WO 2007040378 4/2007

OTHER PUBLICATIONS

International Preliminary Report on Patentability from corresponding International Application No. PCT/IB07/003407.
International Search Report and Written Opinion from corresponding International Application No. PCT/IB07/003407.

* cited by examiner

*Primary Examiner* — Brian A Zimmerman
*Assistant Examiner* — Hung Q Dang
(74) *Attorney, Agent, or Firm* — Renner, Otto, Boisselle & Sklar, LLP

(57) ABSTRACT

Disclosed is are a system and a method for accepting user input in the form of movement of an object against a surface of a electronic device. The movement may take the form of natural writing-style stokes that generate corresponding vibrations. The vibrations may be sensed and analyzed to ascertain meaningful user input. In one approach, a method of processing user input with an electronic device includes sensing vibrations generated by movement of an object against a surface of the electronic device and analyzing signals representative of the sensed vibrations to determine a meaningful user input.

9 Claims, 2 Drawing Sheets

ELECTRONIC DEVICE HAVING VIBRATION INPUT RECOGNITION AND METHOD

TECHNICAL FIELD OF THE INVENTION

The technology of the present disclosure relates generally to user input devices for an electronic device and, more particularly, to a system and method for entering information such as characters, shapes and navigational directions by way of user generated vibrations.

DESCRIPTION OF THE RELATED ART

Mobile and/or wireless electronic devices are becoming increasingly popular. For example, mobile telephones, portable media players and portable gaming devices are now in wide-spread use. In addition, the features associated with certain types of electronic devices have become increasingly diverse. To name a few examples, many electronic devices have cameras, text messaging capability, Internet browsing capability, electronic mail capability, video playback capability, audio playback capability, image display capability and handsfree headset interfaces.

To use the various features of an electronic device, the user may input characters. The characters may include letters, numbers and symbols relating to text in a particular language, such as English or Chinese. The user also may input directional inputs (e.g., to navigate menus, move a cursor, or move a pointer) and lines (e.g., to illustrate shapes). Conventional user input devices include keypads, navigation switches, mice, and touch or pressure sensitive surfaces. Each of these devices may be tedious to use when composing text, especially when using a mobile device with a reduced scale keypad or when working in a language that relies on complex or numerous characters, such as Chinese.

SUMMARY

To facilitate use of an electronic device, there is a need in the art for a system and a method of accepting user input. Disclosed are a system and a method for accepting user input in the form of movement of an object against a surface of the electronic device. The movement may take the form of natural writing-style stokes that generate corresponding vibrations. The vibrations may be sensed and analyzed to ascertain meaningful user input.

According to one aspect of the invention, a method of processing user input with an electronic device includes sensing vibrations generated by movement of an object against a surface of the electronic device; and analyzing signals representative of the sensed vibrations to determine a meaningful user input.

According to one embodiment of the method, the user input corresponds to a directional input, a character input, or a line or shape input depending on an operational mode of the electronic device.

According to one embodiment of the method, the user input corresponds to a direction used for one of moving a cursor, moving a pointer, or navigating a menu.

According to one embodiment of the method, the user input corresponds to entry of a character.

According to one embodiment of the method, the user input is in the form of a series of strokes that correspond to constituent parts of the character.

According to one embodiment of the method, the character is recognized by predictive character recognition that progressively reduces a number of characters from a character database that potentially match the user input as based on the series of strokes.

According to one embodiment of the method, the electronic device is a mobile telephone.

According to one embodiment of the method, the electronic device includes a user input surface that has an arrangement of features that result in distinguishable vibration patterns depending on a direction of the movement of the object.

According to another aspect of the invention, an electronic device includes a plurality of vibration sensors arranged with respect to a surface of the electronic device, the vibration sensors used to detect vibrations generated by movement of an object against the surface and to generate signals representative of the sensed vibrations; and a control circuit that analyzes the signals to determine meaning user input.

According to one embodiment of the electronic device, the user input corresponds to a directional input, a character input, or a line or shape input depending on an operational mode of the electronic device.

According to one embodiment of the electronic device, the user input corresponds to a direction used for one of moving a cursor, moving a pointer, or navigating a menu.

According to one embodiment of the electronic device, the user input corresponds to entry of a character.

According to one embodiment of the electronic device, the user input is in the form of a series of strokes that correspond to constituent parts of the character.

According to one embodiment of the electronic device, the character is recognized by predictive character recognition that progressively reduces a number of characters from a character database that potentially match the user input as based on the series of strokes.

According to one embodiment of the electronic device, the electronic device is a mobile telephone.

According to one embodiment of the electronic device, the surface is a user input surface that has raised or depressed features to enhance vibration production.

According to one embodiment of the electronic device, the features have an arrangement that result in distinguishable vibration patterns depending on a direction of the movement of the object.

According to another aspect of the invention, a method of predictive character recognition based on a series of user strokes that are input to an electronic device includes analyzing the series of user input strokes against a database of characters that are broken down into constituent parts of the characters, each constituent part corresponding to a predetermined user input stroke that is distinguishable from other user input strokes; and progressively reducing a number of characters from the database that potentially match the user input as based on the series of strokes.

According to one embodiment of the method, the characters are Chinese characters and the distinguishable user input strokes include horizontal strokes, vertical strokes, diagonal strokes moving from right to left, dots combined with diagonal strokes moving from left to right, and broken strokes in the horizontal direction or the vertical direction.

According to one embodiment of the method, characters that potentially match the user input are display on a display as user selectable character options.

According to one embodiment of the method, when one potentially matching character remains, the one character is automatically entered as text.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

Figure 1:
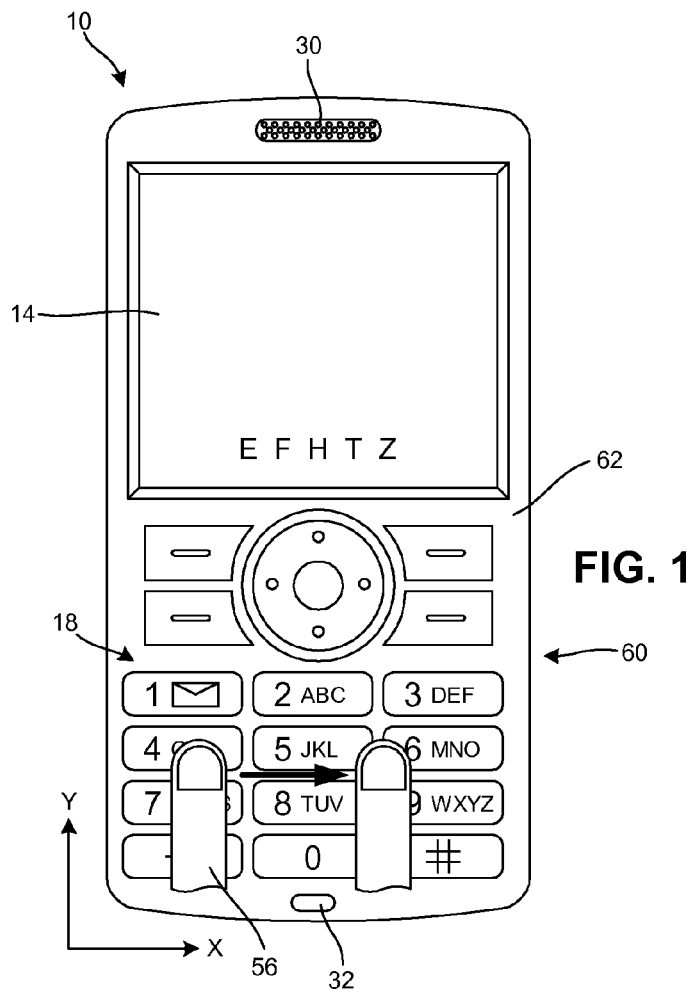
FIG. 1 is a schematic view of a mobile telephone as an exemplary electronic device in accordance with an embodiment of the present invention.

Embodiments of the present invention will now be described with reference to the drawings, wherein like reference numerals are used to refer to like elements throughout. It will be understood that the figures are not necessarily to scale.

The interchangeable terms "electronic equipment" and "electronic device" include portable radio communication equipment. The term "portable radio communication equipment," which hereinafter is referred to as a "mobile radio terminal," includes all equipment such as mobile telephones, pagers, communicators, electronic organizers, personal digital assistants (PDAs), smartphones, portable communication apparatus or the like.

In the present document, embodiments are described primarily in the context of a mobile telephone. It will be appreciated, however, that the exemplary context of a mobile telephone is not the only context and the context may relate to any type of appropriate electronic equipment, examples of which include a media player, a gaming device and a computer. Other electronic equipment may include user input devices that are interfaced with another device. For instance, disclosed features and functions may be incorporated into a dedicated user input device, a mouse, a touch surface, a controller, a keyboard, and so forth. These devices may be connected to supply user input to a computer, a workstation, an automated banking terminal (automated teller machine), an item of machinery, and so forth.

Figure 2:
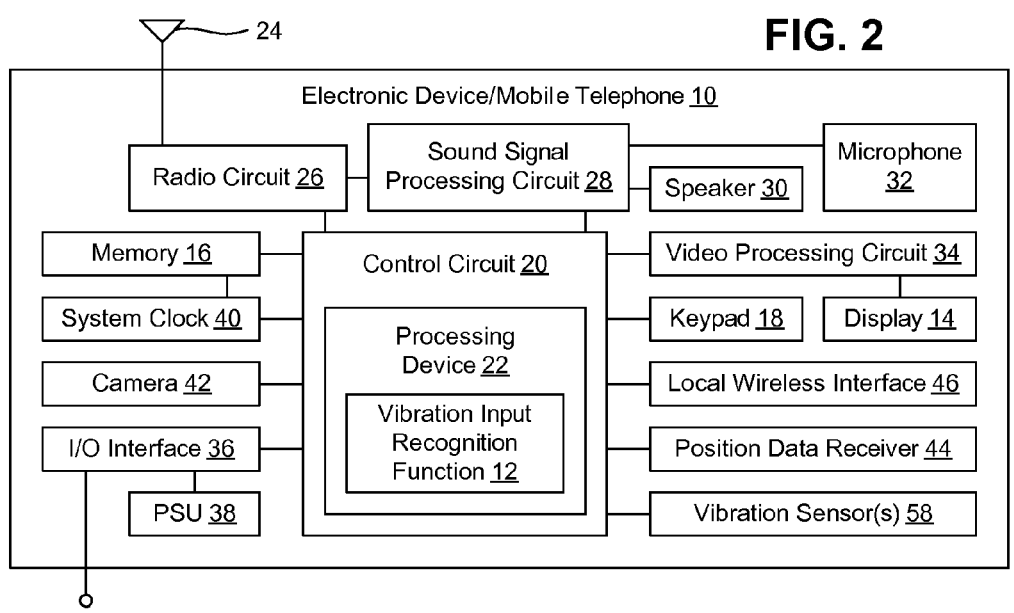
FIG. 2 is a schematic block diagram of the mobile telephone of FIG. 1.

Referring initially to FIGS. 1 and 2, an electronic device 10 is shown. The electronic device 10 includes a vibration input recognition function 12 that is configured to interpret user inputs. The user inputs may take the form of moving an object that is touching one or more surfaces of the electronic device. The movement causes vibrations that are detected by the electronic device 10 and converted to meaningful user input by the vibration input recognition function 12. The object that is moved with respect to the surface of the device may be a finger of the user, a stylus, a blunt instrument, or similar object. The movement may be used as a navigational input to indicate direction in similar manner to inputs generated by a mouse, joystick, navigation switches, etc. The movement may be used to input characters, such as letters, numbers, and symbols. The movement may be used to input lines and shapes to draw corresponding lines and shapes. The type of input may be specified by the user or may depend on the operational mode of the electronic device 10. For instance, navigation inputs may be accepted for menu navigation while character input may be accepted for composing text, dialing telephone numbers, writing messages, completing contact list entries, searching databases, using a word processing program, etc.

Additional details and operation of the vibration input recognition function 12 will be described in greater detail below. The vibration input recognition function 12 may be embodied as executable code that is resident in and executed by the electronic device 10. In one embodiment, the vibration input recognition function 12 may be a program stored on a computer or machine readable medium. The vibration input recognition function 12 may be a stand-alone software application or form a part of a software application that carries out additional tasks related to the electronic device 10.

The electronic device of the illustrated embodiment is a mobile telephone and will be referred to as the mobile telephone 10. The mobile telephone 10 is shown as having a "brick" or "block" form factor housing, but it will be appreciated that other housing types may be utilized, such as a "flip-open" form factor (e.g., a "clamshell" housing) or a slide-type form factor (e.g., a "slider" housing).

The mobile telephone 10 may include a display 14. The display 14 displays information to a user such as operating state, time, telephone numbers, contact information, various navigational menus, etc., that enable the user to utilize the various features of the mobile telephone 10. The display 14 also may be used to visually display content received by the mobile telephone 10 and/or retrieved from a memory 16 (FIG. 2) of the mobile telephone 10. The display 14 may be used to present images, video and other graphics to the user, such as photographs, mobile television content and video associated with games.

While vibration-based user inputs may be accepted by the mobile telephone 10, the mobile telephone 10 may include a conventional keypad 18 that provides for a variety of user input operations. For example, the keypad 18 may include alphanumeric keys for allowing entry of alphanumeric information such as telephone numbers, phone lists, contact information, notes, text, etc. In addition, the keypad 18 may include special function keys such as a "call send" key for initiating or answering a call, and a "call end" key for ending or "hanging up" a call. Special function keys also may include menu navigation and select keys to facilitate navigating through a menu displayed on the display 14. For instance, a pointing device and/or navigation keys may be present to accept directional inputs from a user. Special function keys may include audiovisual content playback keys to start, stop and pause playback, skip or repeat tracks, and so forth. Other keys associated with the mobile telephone may include a volume key, an audio mute key, an on/off power key, a web browser launch key, a camera key, etc. Keys or key-like functionality also may be embodied as a touch screen associated with the display 14. Also, the display 14 and keypad 18 may be used in conjunction with one another to implement soft key functionality.

The mobile telephone 10 includes call circuitry that enables the mobile telephone 10 to establish a call and/or exchange signals with a called/calling device, which typically may be another mobile telephone or landline telephone. However, the called/calling device need not be another telephone, but may be some other device such as an Internet web server, content providing server, etc. Calls may take any suitable form. For example, the call could be a conventional call that is established over a cellular circuit -switched network or a voice over Internet Protocol (VoIP) call that is established over a packet-switched capability of a cellular network or over an alternative packet-switched network, such as WiFi (e.g., a network based on the IEEE 802.11 standard), WiMax (e.g., a network based on the IEEE 802.16 standard), etc. Another example includes a video enabled call that is established over a cellular or alternative network.

The mobile telephone 10 may be configured to transmit, receive and/or process data, such as text messages, instant messages, electronic mail messages, multimedia messages, image files, video files, audio files, ring tones, streaming audio, streaming video, data feeds (including podcasts and really simple syndication (RSS) data feeds), and so forth. It is noted that a text message is commonly referred to by some as "an SMS," which stands for simple message service. SMS is a typical standard for exchanging text messages. Similarly, a multimedia message is commonly referred to by some as "an MMS," which stands for multimedia message service. MMS is a typical standard for exchanging multimedia messages. Processing data may include storing the data in the memory 16, executing applications to allow user interaction with the data, displaying video and/or image content associated with the data, outputting audio sounds associated with the data, and so forth.

FIG. 2 represents a functional block diagram of the mobile telephone 10. For the sake of brevity, generally conventional features of the mobile telephone 10 will not be described in great detail. The mobile telephone 10 includes a primary control circuit 20 that is configured to carry out overall control of the functions and operations of the mobile telephone 10. The control circuit 20 may include a processing device 22, such as a CPU, microcontroller or microprocessor. The processing device 22 executes code stored in a memory (not shown) within the control circuit 20 and/or in a separate memory, such as the memory 16, in order to carry out operation of the mobile telephone 10. The memory 16 may be, for example, one or more of a buffer, a flash memory, a hard drive, a removable media, a volatile memory, a non-volatile memory, a random access memory (RAM), or other suitable device. In a typical arrangement, the memory 16 may include a non-volatile memory (e.g., a NAND or NOR architecture flash memory) for long term data storage and a volatile memory that functions a system memory for the control circuit 20. The volatile memory may be a RAM implemented with synchronous dynamic random access memory (SDRAM). The memory 16 may exchange data with the control circuit 20 over a data bus. Accompanying control lines and an address bus between the memory 16 and the control circuit 20 also may be present.

In addition, the processing device 22 may execute code that implements the vibration input recognition function 12. It will be apparent to a person having ordinary skill in the art of computer programming, and specifically in application programming for mobile telephones or other electronic devices, how to program a mobile telephone 10 to operate and carry out logical functions associated with the vibration input recognition function 12. Accordingly, details as to specific programming code have been left out for the sake of brevity. Also, while the vibration input recognition function 12 is executed by the processing device 22 in accordance with a preferred embodiment, such functionality could also be carried out via dedicated hardware, firmware, software, or combinations thereof.

Continuing to refer to FIGS. 1 and 2, the mobile telephone 10 includes an antenna 24 coupled to a radio circuit 26. The radio circuit 26 includes a radio frequency transmitter and receiver for transmitting and receiving signals via the antenna 24 as is conventional. The radio circuit 26 may be configured to operate in a mobile communications system and may be used to send and receive data and/or audiovisual content. Receiver types for interaction with a mobile radio network and/or broadcasting network include, but are not limited to, GSM, CDMA, WCDMA, GPRS, WiFi, WiMax, DVB-H, ISDB-T, etc., as well as advanced versions of these standards.

The mobile telephone 10 further includes a sound signal processing circuit 28 for processing audio signals transmitted by and received from the radio circuit 26. Coupled to the sound processing circuit 28 are a speaker 30 and a microphone 32 that enable a user to listen and speak via the mobile telephone 10 as is conventional. The radio circuit 26 and sound processing circuit 28 are each coupled to the control circuit 20 so as to carry out overall operation. Audio data may be passed from the control circuit 20 to the sound signal processing circuit 28 for playback to the user. The audio data may include, for example, audio data from an audio file stored by the memory 16 and retrieved by the control circuit 20, or received audio data such as in the form of streaming audio data from a mobile radio service. The sound processing circuit 28 may include any appropriate buffers, decoders, amplifiers and so forth.

The display 14 may be coupled to the control circuit 20 by a video processing circuit 34 that converts video data to a video signal used to drive the display 14. The video processing circuit 34 may include any appropriate buffers, decoders, video data processors and so forth. The video data may be generated by the control circuit 20, retrieved from a video file that is stored in the memory 16, derived from an incoming video data stream that is received by the radio circuit 28 or obtained by any other suitable method.

The mobile telephone 10 may further include one or more I/O interface(s) 36. The I/O interface(s) 36 may be in the form of typical mobile telephone I/O interfaces and may include one or more electrical connectors. As is typical, the I/O interface(s) 36 may be used to couple the mobile telephone 10 to a battery charger to charge a battery of a power supply unit (PSU) 38 within the mobile telephone 10. In addition, or in the alternative, the I/O interface(s) 36 may serve to connect the mobile telephone 10 to a headset assembly (e.g., a personal handsfree (PHF) device) that has a wired interface with the mobile telephone 10. Further, the I/O interface(s) 36 may serve to connect the mobile telephone 10 to a personal computer or other device via a data cable for the exchange of data. The mobile telephone 10 may receive operating power via the I/O interface(s) 36 when connected to a vehicle power adapter or an electricity outlet power adapter.

The mobile telephone 10 also may include a system clock 40 for clocking the various components of the mobile telephone 10, such as the control circuit 20 and the memory 16.

The mobile telephone 10 may include a camera 42 for taking digital pictures and/or movies. Image and/or video files corresponding to the pictures and/or movies may be stored in the memory 16.

The mobile telephone 10 also may include a position data receiver 44, such as a global positioning system (GPS) receiver, Galileo satellite system receiver or the like. The position data receiver 44 may be involved in determining the location of the mobile telephone 10.

The mobile telephone 10 also may include a local wireless interface 46, such as an infrared transceiver and/or an RF interface (e.g., a Bluetooth interface), for establishing communication with an accessory, another mobile radio terminal, a computer or another device. For example, the local wireless interface 46 may operatively couple the mobile telephone 10 to a headset assembly (e.g., a PHF device) in an embodiment where the headset assembly has a corresponding wireless interface.

Figure 3:
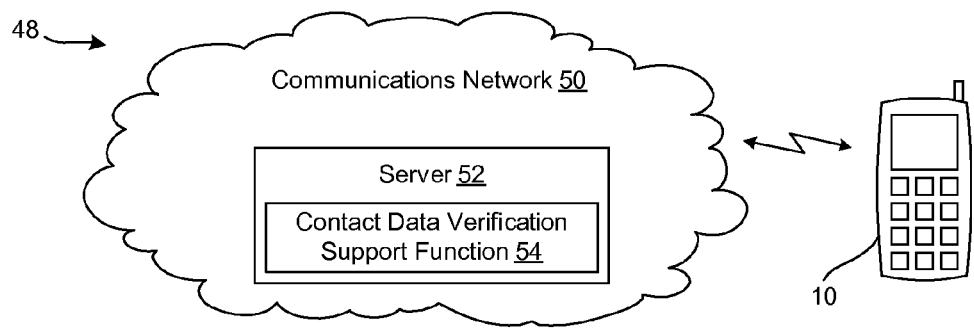
FIG. 3 is a schematic diagram of a communications system in which the mobile telephone of FIG. 1 may operate.

With additional reference to FIG. 3, the mobile telephone 10 may be configured to operate as part of a communications system 48. The system 48 may include a communications network 50 having a server 52 (or servers) for managing calls placed by and destined to the mobile telephone 10, transmitting data to the mobile telephone 10 and carrying out any other support functions. The server 52 communicates with the mobile telephone 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 50 may support the communications activity of multiple mobile telephones 10 and other types of end user devices. As will be appreciated, the server 52 may be configured as a typical computer system used to carry out server functions and may include a processor configured to execute software containing logical instructions that embody the functions of the server 52 and a memory to store such software.

As indicated, user input may be ascertained by detecting and analyzing vibrations caused by movement of an object 56 against a surface of the mobile telephone 10. As depicted in FIG. 1, the object 56 may be a finger of the user. Other objects 56 may include a stylus, a non-writing end of a pen, a pen cap, or similar object.

As the object 56 is moved against the surface, vibrations are generated. These vibrations may be detected using one or more vibration sensors 58 (FIG. 2). In one embodiment, the vibration sensors 58 are accelerometers. In one embodiment, at least two vibration sensors 58 in the form of accelerometers are arranged so that axes of the accelerometers are placed at or near right angles to one another. Further, the axes of the accelerometers may be place in a plane that is parallel to a user input surface 60.

In the example of FIG. 1, the user input surface 60 is the keypad 18. The keypad 18 may be an irregular surface in that keys may protrude from a housing 62, the keys may have curvature, the housing 62 may have curvature, there may be spaces between the keys, and so forth. These irregularities may be beneficial since the irregularities enhance vibration production as the object 56 is moved against the user input surface 60. Enhanced vibration production may lead to more vibration information that is detectable by the vibration sensors 58. On the other hand, the irregularities create a user input surface 60 that is not planar. But one may conceptualize that the user input surface 60 (e.g., keypad 18) has enough common elevation to establish (e.g., as deemed by a designer of the mobile telephone 10) an X-Y plane. An exemplary X-Y plane is depicted in FIG. 1. It is this X-Y plane that may be parallel to the plane in which the axes of the accelerometers are placed in the above-described embodiment. In this manner, vibration information that is indicative of direction, speed and/or duration of movement of the object 56 against the user input surface 60 may be detected by the vibration sensors 58.

In a preferred embodiment, at least one accelerometer vibration sensor 58 has an axis arranged in the X direction and at least one accelerometer vibration sensor 58 has an axis arranged in the Y direction. Additional vibration sensors 58 may be added in the X direction, additional vibration sensors 58 may be added in the Y direction, and/or additional vibration sensors 58 may be added in other directions (e.g., at a 45 degree angle to the X-Y directions, at some other angle to the X-Y directions, in a Z direction perpendicular to the X-Y directions, and so forth). Also, the Y direction may be parallel or non-parallel to a longitudinal axis of the mobile telephone 10.

Figure 4:
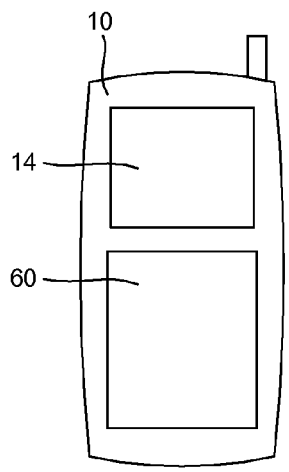
FIG. 4 is another exemplary electronic device in accordance with an embodiment of the present invention.

With additional reference to FIG. 4, a dedicated area of the mobile telephone 10 may be used for the user input surface 60. In the exemplary embodiment of FIG. 4, the keypad 18 is replaced with the user input surface 60. In other embodiments, the user input surface 60 may be added in addition to the keypad 18. While not explicitly shown in FIG. 4, the user input surface 60 preferably has a texture to enhance vibration generation. While a relatively smooth surface, such as the surface of the display 14, may result in vibration generation, it is contemplated that an uneven or textured surface will enhance the generation of vibrations that may be detected and analyzed. The texture may be a random or may be a regular pattern of bumps, ridges, nodes, protuberances, indentations, or combinations of features.

Figure 5:
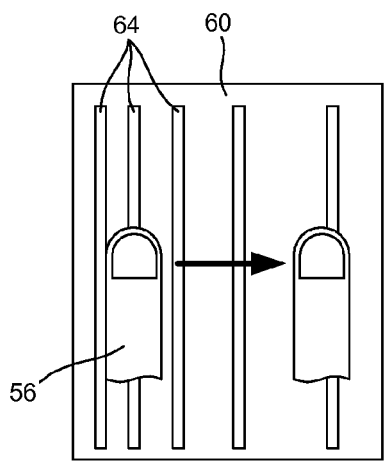
FIG. 5 is a schematic view of an exemplary user input surface for use with an electronic device.
Figure 6:
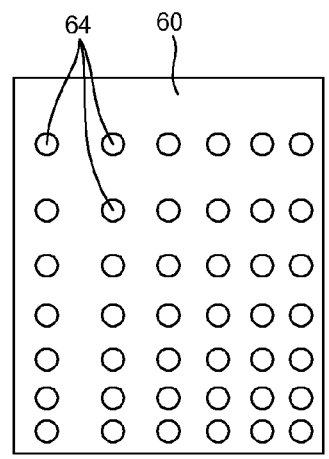
FIG. 6 is a schematic view of another exemplary user input surface for use with an electronic device.

With additional reference to FIGS. 5 and 6, the user input surface 60 may include one or more features 64 that are arranged to load vibrations with information regarding direction, speed and/or duration of movement of the object 56. For instance, the features 64 may be arranged in a distinct manner so that discernable vibration patterns are generated for different movements of the object 56. In particular, the features 64 may be separated from one another and/or sized to aid in the sensing of direction. For instance, the features 64 may generate mathematically distinct frequency and/or phase changes in the output signals of the vibration sensors 58 in response to movement of the object 56 from left to right, movement of the object 56 from right to left, movement of the object 56 from top to bottom, movement of the object 56 from bottom to top, various diagonal movements of the object 56, various non-linear (e.g., curved) movements of the object 56, and so forth. The features may be arranged so that vibration peaks caused by interaction of the features 64 with the object 56 map to signal signatures indicative of direction, speed and/or duration. Thus, the features 64 may lead to the generation of signals that represent vibration and that may be analyzed by the vibration input recognition function with accuracy and repeatability. Also, the features 64 assist in filtering out vibrations that have little or no meaning with respect to user input. For example, vibrations caused by movement of a vehicle, operation of heating or air conditioning apparatus, movement of a hand of the user that is used to hold the mobile telephone 10, and so forth may be ignored.

In the embodiment of FIG. 5, the features 64 are bars (e.g., raised ridges and/or depressed ridges) that have been embossed into the surface 60. The features are illustrated as being vertically disposed (e.g., in the Y direction) and in more closely spaced relationship on the left side of the surface 60 than on the right side of the surface 60. It will be appreciated that the features 64 may be arranged in other manners and/or with other spaced relationships. For instance, horizontal and/or diagonal bars may be added. Also, features 64 of other shapes, widths, heights, lengths, etc. may be used.

In the embodiment of FIG. 6, the features 64 are raised bumps. Some or all of the bumps could be replaced by depressions, and/or other types or configurations of features may be employed. In the illustrated example, the features 64 are more densely populated in a lower right-hand corner of the surface 60 and progress to being more sparsely populated in an upper right-hand corner of the surface 60. As with the embodiment of FIG. 5, the features 6 of the embodiment of FIG. 6 may be arranged in other manners and/or with other spaced relationships.

As indicated, output signals from the vibration sensors 58 may represent vibrations caused by movement of the object 56 against the user input surface 60. The signals may be analyzed by the vibration input recognition function 12 to extract meaningful user input. Each movement of the object 56 in a particular direction or combination of directions may be considered a "stoke." The direction, speed and/or duration of the stokes may be analyzed by the vibration input recognition function 12.

Depending on the operational mode of the mobile telephone 10, the strokes may be used for language inputs and/or non-language inputs. For instance, one or more stokes may be used as directional input (e.g., to move a cursor or mouse pointer, or to navigate through a menu), to draw a shape (e.g., to create lines and shapes in a drawing program), or as a part of a character, such as a letter, number, and symbol (including punctuations marks).

Some strokes may be used to input a character that does not "look like" the stroke. For example, a stroke drawn from the upper left to the lower right may be interpreted as a period symbol. In addition to stokes, tapping of the object 56 against the user input surface 60 may generate vibrations that are associated with meaningful input. For example, in a text entry mode, a single tap may correspond to a period or other punctuation mark, or part of a sequential entry of strokes that correspond to character.

In one embodiment, the strokes may be used to enter text in a specified language. For instance, the language may be English or other language that has characters that are largely based on a Latin alphanumeric character set. As another example, the language may be Chinese or other language having characters that are largely based on symbols and/or combination of symbols. It will be appreciated that still other character sets may be entered using vibration detection including, without limitation, Hebrew, Arabic, Hindi, Thai, and so on.

No matter the language, character recognition may be based on a predictive approach. The predictive approach to recognizing individual characters may work in a manner similar to which T9® works for predicting text entry at a word level. T9® stands for Text on 9 Keys and was developed by Tegic Communications. T9 works by looking up all the possible words contained in a dictionary that correspond to the sequence of key presses. For instance, if a user were to press the seven key of a telephone where the seven key is associated with the characters P, Q, R and S, it would be concluded that the word being entered starts with P, Q, R or S. If the next key were the two key (corresponding to A, B or C), the word would start with a letter from the first key depression, followed by a letter from the second key depression. As an example, words that start with PE would be eliminated from the possible set of matches since "E" is not associated with the two key.

Applying the predictive character recognition to vibration-based inputs, each stoke may be used to predict the character that the user is attempting to enter. In this approach, a set of characters may be stored in a database and, for each character in the database, the character is broken into constituent parts that correspond to possible strokes. Possible strokes include, but are not limited to, horizontal movement, vertical movement, diagonal movement, curved movement (e.g., "C" shaped movement, ")" shaped movement, "U" shaped movement, "∩" shaped movement, or "O" shaped movement), and combinations of movements. When stokes are made, the possible characters corresponding to the detected strokes, as indicated by the character's constituent parts, may be identified. In one embodiment, the identified characters may be displayed on the display 14. The series of strokes may progressively reduce the number of possible characters. Eliminated characters based on each sequential stroke may be removed from the set of possible matches and, if appropriate, removed from the display 14. The user may be given the option to choose a displayed character to expedite character entry.

FIG. 1 illustrates an example of the behavior of predictive character recognition using the English alphabet. In the example, the user has made a left to right horizontal stroke. From the twenty six capital letters in the English alphabet, this horizontal handwriting stroke may be used to designate an E, an F, an H, a T and a Z although it would be possible to add other letters to this set. As shown in the illustrated example, these characters may be displayed on the display 14. Another starting stroke (e.g., a vertical stroke or a curved stroke) may be used to designate another set of characters. Following the example of a horizontal stroke as a starting stroke, if a second stroke is a diagonal stroke, then the predictive character recognition may reduce the option set to Z. Also, a second horizontal stroke would exclude H, T and Z and suggest F or E. Once one character remains in the possible set, the character may be automatically accepted and entered into the text that the user is composing. Lower case letters, numbers, punctuation marks and/or accent marks may be entered in a similar manner.

As indicated, the predictive character recognition may be used for languages besides English or other languages that are based on Latin character sets (e.g., many European languages). As another example, Chinese may be entered using predictive character recognition. Chinese characters may be broken down into their smallest constituent parts. Most Chinese characters/symbols, if not all Chinese characters/symbols, may be defined by five constituent parts that correspond to discernable stokes. The five strokes include horizontal strokes, vertical strokes, diagonal strokes moving from right to left, dots (which may be input as taps against the user input surface) with diagonal strokes moving from left to right, and broken strokes in the horizontal direction or the vertical direction. Using a process of eliminating characters based on the series of strokes entered by the user, Chinese characters may be efficiently entered into the mobile telephone 10.

The vibration-based predictive character recognition technique may be user independent or user specific. A user independent approach would attempt to narrow the set of potential characters based on the sensed vibration in a uniform manner no matter the user or writing style of the user. A user specific approach would learn from user entry of strokes to gain knowledge of the user's typical stoke style. Correct predictions and incorrect predictions may be tracked as a function of manual corrections made by the user. This data combined with nuances in detected vibrations may be used to more accurately predict characters that the user is attempting to input.

Also, the vibration input recognition function 12 may develop knowledge regarding characters that are commonly used by the user. The more commonly used characters may be given preference over less commonly used characters.

The predictive character recognition technique may be applied to input sources other than detected vibrations. For instance, inputs from a touch sensitive surface or a light pen may be analyzed in a progressive elimination scheme determine a character that corresponds to a series of movements made by a user.

In another approach, a handwriting recognition algorithm may be used to correlate a single stoke that may contain movement in multiple directions with a particular character. Thus, handwriting recognition may entail matching a character against a stoke made by the user. One exemplary handwriting recognition technique is Graffiti® available in many products from Palm, Inc.

Although certain preferred embodiments have been shown and described, it is understood that equivalents and modifications will occur to others skilled in the art upon the reading and understanding of this specification. The present invention includes all such equivalents and modifications, and is defined in varying degrees of scope by the following claims.

What is claimed is:

1. A method of processing user input with an electronic device, comprising:
   sensing vibrations in a first direction and a second direction perpendicular to the first direction, the vibrations generated by movement of an object against a surface of the electronic device, the sensing including detecting vibration information that is indicative of direction, speed and duration of the movement;
   generating signals corresponding to the sensing in the first direction and generating signals corresponding to the sensing in the second direction; and
   analyzing the signals corresponding to the sensed vibrations to determine a character from user input of constituent parts of the character by identifying meaningful user input related to a series of natural writing style strokes that correspond to the constituent parts of the character as indicated by the direction, speed and duration of the movement; and
   wherein the surface of the electronic device is a user input surface that has an arrangement of raised or depressed features purposefully configured to enhance vibration production and to load vibrations with distinguishable vibration information regarding direction, speed and duration of the movement of the object; and
   wherein movement of the object against the features generates mathematically distinct frequency or phase changes in the generated signals of the vibration sensors in response to each of movement of the object from left to right, movement of the object from right to left, movement of the object from top to bottom, movement of the object from bottom to top, movement of the object diagonally, and movement of the object in a non-linear fashion.

2. The method of claim 1, wherein the character is recognized by predictive character recognition that progressively reduces a number of characters from a character database that potentially match the user input as based on the series of strokes.

3. The method of claim 1, wherein the electronic device is a mobile telephone.

4. The method of claim 2, wherein the characters are Chinese characters and the distinguishable user input strokes include horizontal strokes, vertical strokes, diagonal strokes moving from right to left, dots combined with diagonal strokes moving from left to right, and broken strokes in the horizontal direction or the vertical direction.

5. The method of claim 2, wherein characters that potentially match the user input are displayed on a display as user selectable character options.

6. The method of claim 2, wherein when one potentially matching character remains, the one character is automatically entered as text.

7. An electronic device, comprising:
   a plurality of vibration sensors arranged with respect to a surface of the electronic device, the vibration sensors configured to:
      detect vibrations in a first direction and a second direction perpendicular to the first direction, the vibrations generated by movement of an object against the surface; and
      generate signals representative of the sensed vibrations in the first and second directions that together include vibration information that is indicative of direction, speed and duration of movement of the object; and
   a control circuit that analyzes the signals corresponding to the sensed vibrations to determine a character from user input of constituent parts of the character by identifying meaningful user input related to a series of natural writing style strokes that correspond to the constituent parts of the character as indicated by the direction, speed and duration of the movement; and
   wherein the surface is a user input surface that has an arrangement of raised or depressed features purposefully configured to enhance vibration production and to load vibrations with distinguishable vibration information regarding direction, speed and duration of the movement of the object; and
   wherein movement of the object against the features generates mathematically distinct frequency or phase changes in the generated signals of the vibration sensors in response to each of movement of the object from left to right, movement of the object from right to left, movement of the object from top to bottom, movement of the object from bottom to top, movement of the object diagonally, and movement of the object in a non-linear fashion.

8. The electronic device of claim 7, wherein the character is recognized by predictive character recognition that progressively reduces a number of characters from a character database that potentially match the user input as based on the series of strokes.

9. The electronic device of claim 7, wherein the electronic device is a mobile telephone.

* * * * *